United States Patent Office 3,574,591
Patented Apr. 13, 1971

3,574,591
METHODS FOR PREPARING MIXED CATION POLYPHOSPHATES
John W. Lyons, St. Louis, and George A. Rauh, Jr., and Howard L. Vandersall, Ballwin, Mo., assignors to Monsanto Company
No Drawing. Filed May 15, 1968, Ser. No. 729,385
Int. Cl. C05b 1/00
U.S. Cl. 71—1                                                     9 Claims

ABSTRACT OF THE DISCLOSURE

A process for producing slowly soluble ammonium-potassium-multivalent metal cation polyphosphates, useful as slow release fertilizers is disclosed which process compries thermally condensing (1) an inorganic phosphate-containing material (2) a potassium-containing material and (3) a multivalent metal source, in the presence of a combined ammoniating and condensing agent, under controlled temperature conditions to thereby produce the mixed cation polyphosphates containing specified ratios of the nitrogen and potassium and specified quantities of multivalent cations.

---

This invention relates to novel mixed cation polyphosphate compositions. More particularly, this invention relates to mixed cation polyphosphates which are slowly soluble in water, which contain, as cations, substantial percentages of ammonium, potassium and other metallic cations and a process for preparing the slowly soluble polyphosphates.

In some fertilizers it is preferred to have the fertilizer dissolve slowly so that the plant nutrients receive smaller amounts of all of the nutrients over a longer portion of the growing season. It is also preferred for fertilizers to contain nitrogen, potassium and phosphorus and other agronomically effective plant nutrients such as iron, manganese, copper and zinc. Heretofore, only a slow release nitrogen containing fertilizer is commercially available and the other nutrients such as potassium, phosphorus and trace metals are all quickly released to the plants. For example, a typical fertilizer is a blend of a nitrogen-phosphorus compound such as an ammonium orthophosphate, a high nitrogen source such as urea or ammonium nitrate and a potassium compound such as a potassium carbonate to which trace amounts of iron, manganese, copper or zinc compounds can be added. Since different compounds were employed, the nutrients did not dissolve at the same rate. For example, the ammonium orthophosphates have a different water solubility and a different solubility rate than urea and ammonium nitrate or potassium carbonate. Furthermore, the trace nutrients were released unevenly and geneally relatively rapidly. Therefore, there is a need for a fertilizer containing the plant nutrients of nitrogen, phosphorus, potassium, iron, manganese, copper and/or zinc and which is slowly soluble and has the same or controlled solubility rates for the foregoing plant nutrients. The present invention provides a chemical composition which contains the mixed cation polyphosphates having the solubility characteristics and other physical characteristics which are desirable in a slow release type fertilizer. Therefore, by the practice of this invention, there is provided in a single chemical composition a fertilizer containing many of the desired plant nutrients having a low solubility rate which will release a number of the nutrients at the same rate or at the rate deemed most desirable from agronoimcal considerations.

In accordance with this invention, the compounds are prepared by the thermal condensation of an ammoniating, condensing agent, a nitrogen-containing material such as the ammonium phosphates, a potassium-containing material selected from the group consisting of monopotassium orthophosphates, potassium polyphosphates, potassium hydroxide, potassium carbonate and the like and mixtures thereof and a source of a plant nutrient selected from the group consisting of iron, manganese, copper and zinc and a phosphorus-containing material. The polyphosphates of the present invention are long chain polymeric materials having as cations ammonium and potassium and either one or more cations selected from the group consisting of Fe, Mn, Cu and Zn.

These polymeric mixed cation polyphosphates can be either straight chain structures or branched chain structures but are not cyclic in nature. It should be noted that substantially all of the nitrogen in these polyphosphates is present as the ammoniacal nitrogen and there is substantially no nuclear nitrogen present in the polyphosphates. In addition, when the polyphosphates of the instant invention are characterized herein as being slowly soluble, it is intended to mean that the initial solubility of a slurry of 10 grams of solids/100 cc. of water at 25° C. for 60 minutes is about 5 grams/100 cc. of water or less. Thus, the initial nutrient release is at most about 50% of the total nutrient release. Specifically, for purposes of the present invention, a mixed-cation polyphosphate having an initial solubility of a specified value refers to the initial solubility in grams per 100 cc. of water when 10 grams of the mixed cation polyphosphate is slurried in 100 cc. of water at 25° C. for 60 minutes.

The degree of polymerization of the slowly water-soluble polyphosphates is difficult to determine since known methods for determining such are "so-called" solution methods, that is, they employ solution techniques for polymerization measurements. For example, as determined by the end group titration method [Van Wazer, Griffith and McCullough, Anal. Chem., 26, 1755 (1954)] after converting the polyphosphates to the acid form by ion exchange resins [Van Wazer and Holst, J. Am. Chem. Soc., 72, 639 (1950)], the average numerical value of $n$ is from about 20 to about 400, preferred from about 40 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Physical Chemistry," Butterworths, London (1956)] the weight average value of $n$ is above about 500 and preferred from about 500 to about 100,000 with from about 1,000 to about 30,000 being especially preferred.

The mixed cation polyphosphates of the instant invention can be prepared by, in general, carrying out the thermal condensation method for producing ammonium polyphosphate in the presence of a potassium and a multivalent metal source selected from the group consisting of iron, manganese, copper and zinc. That is, the processes as disclosed in co-pending patent applications Ser. No. 514,657, filed Dec. 17, 1965 now abandoned, of which application Ser. No. 722,499, filed Dec. 7, 1967 is a divisional application thereof, and Ser. No. 420,459, filed Dec. 22, 1964, now U.S. Pat. 3,397,035 granted Aug. 13, 1968 can be used with the exception that in addition to the reactants disclosed therein, the thermal condensation is conducted in the presence of a multivalent metal source selected from the group consisting of Fe, Mn, Cu and Zn and a potassium-containing material generally selected from the group consisting of potassium salts of inorganic acids, potassium salts of aliphatic acids having from 1 to 4 carbon atoms and potassium bases. Preferred potassium sources are potassium hydroxide and potassium salts selected from the group consisting of potassium carbonate, potassium phosphates, potassium sulfate, potassium chloride and mixtures thereof.

Orthophosphoric acids ($H_3PO_4$) and condensed phosphoric acids can be used as a phosphate source. Condensed phosphoric acid is a phosphoric acid containing any quantity of one or more polyphosphoric acids and/or metaphosphoric acids and any such acid can be employed in this invention. The polyphosphoric acids include pyrophosphoric acid and other polymers from the tri- to the nonapolymer and higher. The properties and compositions of the condensed phosphoric acids vary with the $P_2O_5$ content of the condensed phosphoric acid as discussed in Van Wazer, Phosphorus and Its Compounds, Interscience Publishers, Inc., New York, N.Y., vol. 1 (1958), and shown by Table 12–1, page 748. Although, in general, for the instant invention, any ortho or condensed phosphoric acid is suitable as the acid source, the preferred phosphoric acids are condensed, liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid. Additionally, the ammonium phosphate salts with a lower degree of polymerization can also be used as the phosphorus source, such as the ammonium orthophosphates, ammonium pyrophosphates and the ammonium polyphosphates having relatively short chain lengths, that is, chain lengths less than about 10 phosphorus atoms.

Typical of the ammoniating and condensing agents which are suitable for use in the instant invention are those nitrogenous compounds which are capable of releasing ammoniacal nitrogen and condensing the phosphorus-containing reactant or reactants at temperatures in range between about 170° C. and about 260° C. In particular are the compounds containing one or more amide groups, i.e., a compound resulting from replacement of one or more atoms of hydrogen in ammonia by univalent acid radicals, and particularly the primary amides, and containing the elements carbon and/or sulfur nitrogen, oxygen and hydrogen as well as containing no carbon-carbon bonds. Preferably the compounds are non-cyclic structures and there are few, if any, compounds which contain 3 or more amide groups which can be used in practicing the present invention. Especially preferred are low molecular weight nitrogeneous compounds, i.e., having a molecular weight below about 200, and containing at least one but no more than two of the following radicals: carbamyl, carbamic, sulfamino, sulfamyl and ureido. As being illustrative of such compounds are urea, ammonium carbamate, biuret, sulfamide, sulfamic acid, ammonium sulfamate, guanyl urea methyl urea, amino urea, 1-3-di-amino urea, biurea and the like with urea, because of its relative inexpensiveness and ready availability, being particularly preferred. Other condensing agents and ammoniating agents described in the previously mentioned application Ser. No. 420,459, now U.S. Pat. 3,397,035, are also employed in process of this invention and incorporated therein by reference.

In general, any multivalent metal source can be used which will ionize under the reaction conditions and form a cation for the polyphosphate anion. In most instances a multivalent compound which has a relatively high weight ratio of its multivalent metal cation to the anion portion of the molecule will be used, therefor, it is generally preferred to use multivalent salts of inorganic acids, such as phosphoric, hydrochloric, sulfuric and the like, or multivalent salts of the lower molecular weight organic acids such as acetic, formic, propanoic and the like, or multivalent bases and oxides such as ferric hydroxide, ferric oxide, zinc oxide, manganese oxide, zinc hydroxide, copper oxide and the like.

Although the amount of multivalent metal can vary from trace amounts to about 10% by weight, generally relatively minor amounts will be used, that is, from about 0.1% to about 5% by weight of the mixed cation polyphosphate, with from about 0.2% to about 3% by weight being preferred.

One method for preparing polyphosphates of the instant invention entails reacting condensed phosphoric acid and the combined ammoniating and condensing agent adding a suitable potassium source and one or more suitable multivalent metal sources selected from the group consisting of Fe, Zn, Cu and Mn and heat treating the reaction product. In general, it is usually only necessary to add the combined ammoniating and condensing agent to the condensed phosphoric acid, preferably admixing the reactants with a suitable potassium source and the multivalent metal source and heating the admixture for the reaction to take place. The amounts of the combined ammoniating and condensing agent, phosphoric acid and potassium source will vary depending upon the ratio of nitrogen to phosphorus to potassium ratio desired in the final product. Since the final products, i.e., ammonium-potassium metal polyphosphates, have at most an ammoniacal nitrogen to phosphorus molar ratio of about 0.95:1, large excess amounts of nitrogen tend to produce by-products formed from the combined ammoniating and condensing agents, such as, cyanuric acid and the like when using urea as the ammoniating and condensing agent. In most cases, the reaction is exothermic at about 120° C. to about 150° C., although if the heat is applied continuously for longer periods of time, i.e., about 1 to about 30 hours, the reaction can be made to proceed using temperatures as low as 110° C. The times and temperature of heat treating required will depend upon, inter alia, the degree of polymerization desired as well as upon the proportions and physical states, i.e., degree of subdivision, uniformity of mixing, etc., of the reactants. In general, the times necessary to produce the desired product are dependent on the temperatures used with higher temperatures requiring shorter periods of time for heat treating. It should be noted, however, that it may be advantageous at times to heat treat the reaction product of the combined ammoniating and condensing agent short of substantially complete conversion to ammonium polyphosphates and then add the potassium. When this is done, the initial heat treating temperatures are generally at relatively low temperatures for a relatively short heat treating time period. When substantially complete conversion to ammonium polyphosphate is desired before adding potassium, temperatures between about 210° C. and about 240° C. for periods of time between about 1 and 24 hours are preferred, although temperatures as low as 180° C. for periods of time between about 30 and 36 hours as well as temperatures as high as about 255° C. for periods of time between about 15 and 20 hours are sufficient in some cases to produce the ammonium polyphosphate compounds. In general, temperatures less than about 180° C. are insufficient to form the ammonium polyphosphates in a reasonable heat-treating period while temperatures in excess of about 260° C. tend to degrade or decompose the ammonium ion from the polyphosphate polymer.

Another method for preparing the polyphosphates of the instant invention entails reacting orthophosphoric acid and a combined ammoniating and condensing agent and heat treating the reaction product in the presence of a combined ammoniating and condensing agent and a potassium source selected from the group consisting of potassium orthophosphate, potassium polyphosphate, potassium hydroxide, potassium carbonate and the like and mixtures thereof and one or more multivalent metal sources, if desired. Usually, any concentration of orthophosphoric acid can, in general, be used although it is preferred that concentrations above about 40% $H_3PO_4$ by weight be used and particularly preferred are concentrations of 85% $H_3PO_4$ and higher. In general, it is usually only necessary to add the combined ammoniating and condensing agent to the orthophosphoric acid and the potassium source and the multivalent metal source, preferably admixing the reactants, and heating the admixture for the reaction to take place. As was applicable when using the condensed phosphoric acid as a reactant as hereinabove described, amounts of reactants can vary depending upon the desired nitrogen to potassium to phosphorus molar ratio desired and the amount of multivalent metals desired in the product. Since orthophosphoric acid can contain water and since water in the product has deleterious effects on the product obtained from heat treating as hereinabove described, it may be necessary in some cases to prevent or minimize the possibility of water in the reaction product by using excess amounts of the combined ammoniating and condensing agent in order to remove the water by its hydrolysis. In most cases, the reaction will occur between about 110° C. to about 140° C. with the temperature being maintained for a sufficient time to produce the reaction product. Usually the reaction is initiated as soon as the temperature is reached although in some cases it may be necessary to maintain the temperature for one hour or longer, that is, up to about 300 hours. Depending upon the nitrogen to potassium to phosphorus molar ratio of reactants used, the reaction product produced will vary. Final temperature of between about 170° C. and about 260° C. for periods of time between about 20 to about 26 hours are preferred to obtain substantial conversion, with temperatures of between about 180° C. to about 220° C. for about 20 to 26 hours being particularly preferred, to produce the slowly soluble ammonium-potassium polyphosphate compounds of the instant invention. Relatively low temperatures are insufficient to form the compounds of the instant invention in a reasonably short length of time (less than about 170° C.), while temperatures in excess of about 260° C. tend to degrade or decompose the product, thereby preventing formation of compounds with the desired composition, chain lengths and properties.

A further method for preparing the polyphosphates of the instant invention entails heat treating urea phosphate in the presence of a suitable potassium source and the multivalent metal source if desired, under conditions which are applicable to heat treating the reaction product of condensed phosphoric acid and the combined ammoniating and condensing agent as discussed hereinabove.

A still further method for preparing the polyphosphates of the instant invention entails reacting ammonium and potassium phosphate salts, i.e., monoammonium and monopotassium orthophosphate, diammonium and dipotassium orthophosphate, triammonium and tripotassium phosphates, and mixtures thereof and a multivalent metal source if desired, with the combined ammoniating and condensing agent. In general, it is usually only necessary to admix the ammonium and potassium phosphates and the combined ammoniating and condensing agent and heat treat the admixture in order to produce the compounds of the instant invention. Usually amounts of the combined ammoniating and condensing agent and ammonium and potassium sources between about 1 to about 7 on a nitrogen and potassium to phosphorus molar ratio basis of reactants are sutiable, with a molar ratio of between about 1 and about 3 being particularly preferred. In general, the reactants need only be heated to temperatures sufficient to form a melt and then heat treating the melt for a time sufficient to produce the compounds of the instant invention. In most cases, temperatures as low as 170° C. for about 30 hours and as high as 250° C. for about 20 hours are suitable with temperatures of about 210° C. for about 24 hours being particularly preferred.

The molar ratio of potassium to nitrogen in the reactants should be in the ratio of about 1:10 to about 10:1 depending upon the ratio of nitrogen to potassium that is desired in the final product. That is, if a material having a relatively high nitrogen to potassium ratio is desired, then the ratio of nitrogen to potassium in the reactants can be about 10:1 and decreased down to about 1:10. Choice of the particular ratio in the final product will be dependent to a large degree upon the end use application. For example, the nitrogen to potassium ratio desired for a fertilizer will vary according to the soil upon which it is used, and upon the particular plants that are to be fertilized.

EXAMPLE 1

About 115 parts of monoammonium orthophosphate, about 40 parts of monopotassium orthophosphate, about 80 parts of urea, about 25 parts of ammonium polyphosphate and about 10 parts of anhydrous copper sulfate are blended together in a rotary calciner and heated at a temperature of 275° C. for about 22 hours. A sample of the material indicated 9.8% nitrogen, 8.5% potassium, 29.8% phosphate, and 2.9% copper. When 10 grams of the material were stirred with 100 cc. of water for about one hour, 1.4% of the material dissolved. The product is useful as a slow release fertilizer and will give a constant release of the plant nutrients over a relatively long period of time. At least 90% of the phosphorus is available to the plant as the sample has a 90% availability as determined by A.O.A.C. methods for determining available $P_2O_5$ using citrate solubilities. Substantially similar results are obtained when copper salts of other inorganic acids such as phosphoric acid and hydrochloric acid and copper salts of the lower aliphatic acids are used in place of the copper sulfate in substantially equal levels of copper in the above procedure. Additionally, when iron, manganese or zinc salts of the foregoing acids are added, a polyphosphate containing ammonium, potassium and other multivalent metal cations is produced. By using several salts containing different cations, a fertilizer containing essentially all of the trace nutrients found useful in plant life can be produced.

We claim:
1. A process for preparing slowly soluble mixed cation polyphosphate which comprises thermally condensing an inorganic phosphate-containing material, a condensing and ammoniating agent, a potassium-containing material selected from the group consisting of potassium bases, potassium salts of inorganic acids, potassium salts of lower aliphatic acids and mixtures thereof, and a multivalent metal source selected from the group consisting of Fe, Mn, Cu and Zn salts of inorganic acids and bases, said thermal condensation conducted at temperatures of from about 100° C. to about 350° C. for a time sufficient to produce a mixed cation polyphosphate containing at least about 50% of its cations selected from the group consisting of ammonium and potassium and the molar ratio of potassium to ammonium being from about 1:10 to about 10:1 and containing from about 0.1% to about 10% by weight of said multivalent metal.

2. A process according to claim 1 wherein a combined ammoniating agent and condensing agent containing at least one amide group is used.

3. A process according to claim 2 wherein said phosphate-containing material is selected from the group consisting of ammonium phosphates, orthophosphoric acid, condensed phosphoric acid and mixtures thereof.

4. A process according to claim 3 wherein said potassium-containing material is selected from the group consisting of potassium orthophosphates, potassium polyphosphates, potassium hydroxide, potassium chloride, potassium carbonate, potassium acetate and mixtures thereof.

5. A process according to claim 4 wherein said combined ammoniating and condensing agent is urea.

6. A process according to claim 5 wherein said phosphate-containing material is ammonium orthophosphate.

7. A process according to claim 5 wherein said potassium-containing material is potassum orthophosphate.

8. A process according to claim 6 wherein said multivalent metal cation source is iron, manganese, copper and zinc salts of an inorganic acid and said multivalent metal is from about 0.1% to about 5% by weight of the mixed cation polyphosphate.

9. A process according to claim 8 wherein said potassium-containing material is potassium chloride.

References Cited
UNITED STATES PATENTS

| | | | |
|---|---|---|---|
| 2,288,418 | 6/1942 | Partridge | 23—106 |
| 3,244,500 | 4/1966 | Stinson et al. | 71—1 |
| 3,361,523 | 1/1968 | Shen | 23—106 |
| 3,397,035 | 8/1968 | Shen et al. | 23—106 |
| 3,416,910 | 12/1968 | Legal, Jr., et al. | 71—43 |

REUBEN FRIEDMAN, Primary Examiner

C. N. HART, Assistant Examiner

U.S. Cl. X.R.

71—29, 34